US010681123B2

(12) United States Patent
Qi et al.

(10) Patent No.: US 10,681,123 B2
(45) Date of Patent: *Jun. 9, 2020

(54) RESPONDING TO A RANGING REQUEST FROM A PEER DEVICE IN A WIRELESS NETWORK

(71) Applicant: Intel IP Corporation, Santa Clara, CA (US)

(72) Inventors: Emily H. Qi, Gig Harbor, WA (US); Jonathan Segev, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,675

(22) Filed: Aug. 22, 2018

(65) Prior Publication Data
US 2019/0116223 A1 Apr. 18, 2019

Related U.S. Application Data

(63) Continuation of application No. 15/077,173, filed on Mar. 22, 2016, now Pat. No. 10,075,516.

(Continued)

(51) Int. Cl.
H04L 29/08 (2006.01)
H04W 4/21 (2018.01)
(Continued)

(52) U.S. Cl.
CPC .............. H04L 67/104 (2013.01); G01S 5/00 (2013.01); G01S 11/08 (2013.01); G01S 13/74 (2013.01); H04W 4/023 (2013.01); H04W 4/21 (2018.02)

(58) Field of Classification Search
None
See application file for complete search history.

(56) References Cited

U.S. PATENT DOCUMENTS 10,075,516 B2   9/2018  Qi et al.
2008/0259896 A1  10/2008  Sahinoglu et al.
(Continued)

FOREIGN PATENT DOCUMENTS

WO   WO-2011006768 A1   1/2011
WO   WO-2012144727 A1   10/2012
WO   WO-2017023496 A1   2/2017

OTHER PUBLICATIONS

"U.S. Appl. No. 15/077,173, Examiner Interview Summary dated Jan. 24, 2018", 3 pgs.
(Continued)

Primary Examiner — Alex Skripnikov
Assistant Examiner — Sharmin Chowdhury
(74) Attorney, Agent, or Firm — Schwegman Lundberg & Woessner, P.A.

(57) ABSTRACT

The application layer of a first wireless device may be configured to receive a ranging request indication from a MAC layer of the first wireless device, determine whether the MAC layer should respond to the ranging request, and send a ranging response to the MAC layer with an indication of whether to respond to the ranging request. The MAC layer may be configured to decode a ranging set-up request from a second wireless device, where the ranging set-up request comprises time slots. If an auto-response is set to false, send a ranging request indication to the application layer and receive from the application layer a ranging response, and if the auto-response is set to true or the ranging response indicates the MAC layer should respond to the ranging set-up request, select a time slot, and encode a ranging response with an indication of the selected time slot.

19 Claims, 6 Drawing Sheets

Related U.S. Application Data

(60) Provisional application No. 62/201,896, filed on Aug. 6, 2015.

(51) Int. Cl.
    *G01S 5/00*    (2006.01)
    *G01S 11/08*   (2006.01)
    *G01S 13/74*   (2006.01)
    *H04W 4/02*    (2018.01)

(56) References Cited

U.S. PATENT DOCUMENTS

| | | |
|---|---|---|
| 2010/0157933 A1 | 6/2010 | Park et al. |
| 2014/0349578 A1 | 11/2014 | Huang et al. |
| 2014/0355461 A1* | 12/2014 | Aldana ............ G01S 5/00 370/252 |
| 2014/0365694 A1 | 12/2014 | Bolton et al. |
| 2015/0172391 A1 | 6/2015 | Kasslin et al. |
| 2016/0183113 A1 | 6/2016 | Dua et al. |
| 2017/0041926 A1 | 2/2017 | Qi et al. |

OTHER PUBLICATIONS

"U.S. Appl. No. 15/077,173, Non Final Office Action dated Aug. 24, 2017", 34 pgs.

"U.S. Appl. No. 15/077,173, Notice of Allowance dated May 10, 2018", 22 pgs.

"U.S. Appl. No. 15/077,173, Response filed Jan. 18, 2018 to Non Final Office Action dated Aug. 24, 2017", 11 pgs.

"International Application Serial No. PCT/US2016/041736, International Preliminary Report on Patentability dated Feb. 15, 2018", 8 pgs.

"International Application Serial No. PCT/US2016/041736, International Search Report dated Oct. 20, 2016", 3 pgs.

"International Application Serial No. PCT/US2016/041736, Written Opinion dated Oct. 20, 2016", 6 pgs.

\* cited by examiner

# RESPONDING TO A RANGING REQUEST FROM A PEER DEVICE IN A WIRELESS NETWORK

PRIORITY CLAIM

This application is a continuation of U.S. patent application Ser. No. 15/077,173, filed Mar. 22, 2016, now issued as U.S. patent Ser. No. 10/075,516, which claims the benefit of priority under 35 USC 119(e) to U.S. Provisional Patent Application Ser. No. 62/201,896, filed Aug. 6, 2015, each of which is incorporated herein by reference in its entirety.

TECHNICAL FIELD

Embodiments pertain to wireless networks and wireless communications. Some embodiments relate to peer-to-peer networks (P2P) networks. Some embodiments relate to Wi-Fi Alliance (WFA) Neighbor Awareness Networking (NAN), Some embodiments relate to wireless local area networks (WLANs) including networks operating in accordance with the WEE 802.11 family of standards (e.g., 802.11mc, 802.11ac, and 802.11ad). Some embodiments relate to IEEE 802.11ax, 802.11ay, and/or 802.11az. Some embodiments relate to methods, computer readable media, and apparatus for generating and/or responding to ranging requests in a wireless network.

BACKGROUND

Efficient use of the resources of a P2P network, which may be NAN, is important to provide bandwidth and acceptable response times to the users of the P2P network or NAN. However, often there are many devices trying to share the same resources. Additionally, many devices may be running applications such as social network applications. Moreover, wireless devices may need to operate with both newer protocols and with legacy device protocols.

Thus, there are general needs for improved methods, apparatuses, and computer readable media for responding to ranging requests from peer devices.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
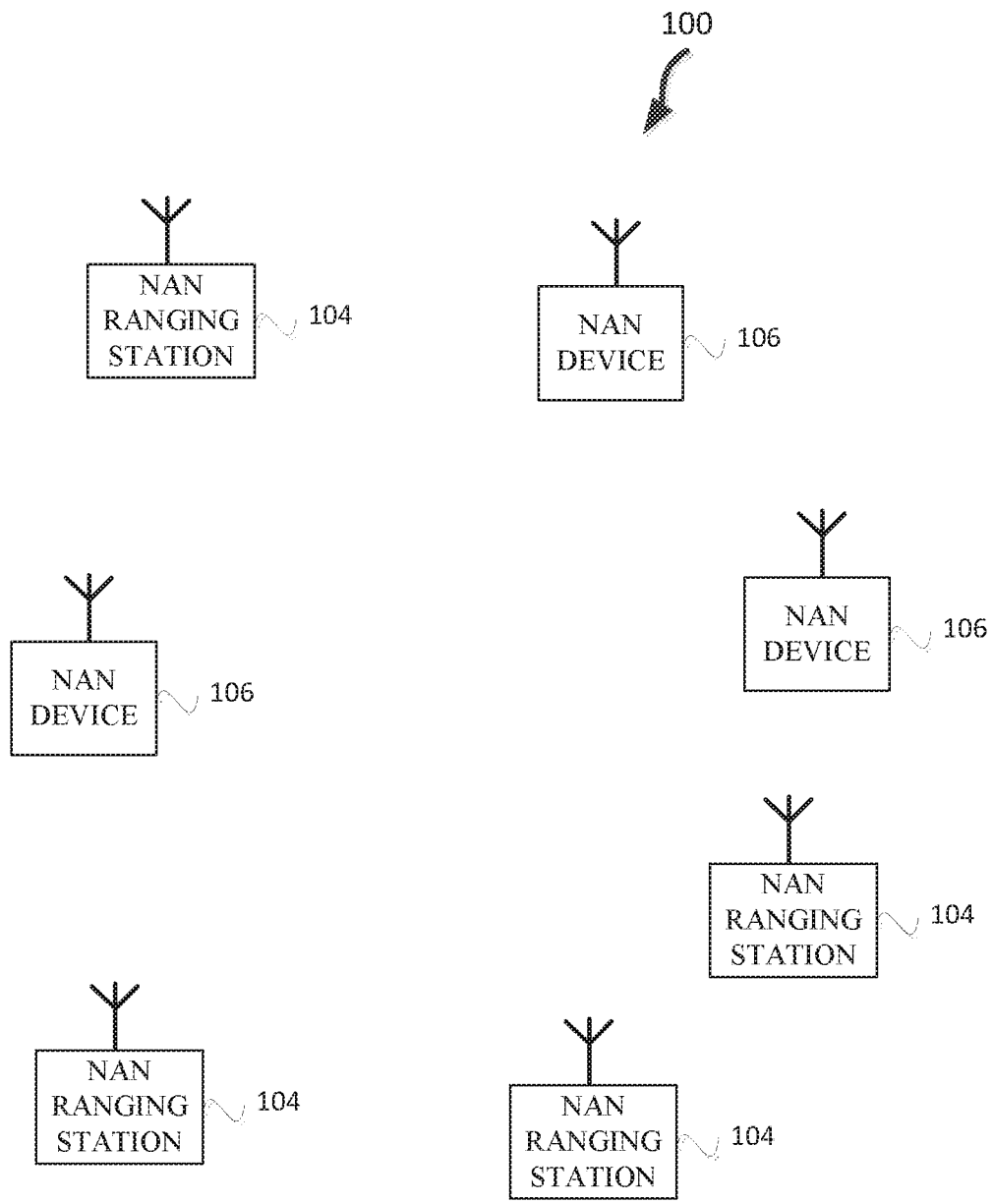
FIG. 1 illustrates a P2P network in accordance with some embodiments.

FIG. 1 illustrates a P2P network 100 in accordance with some embodiments. The P2P network 100 may be a NAN. The P2P network 100 may comprise NAN ranging devices 104 and NAN devices 106. The NAN ranging devices 104 and NAN devices 106 may be IEEE 802.11 stations or access points.

The NAN ranging devices 104 and NAN devices 106 may support NAN synchronization where the NAN ranging devices 104 and NAN devices 106 may exchange frames to synchronize. The NAN ranging devices 104 NAN devices 106 may operate in accordance with IEEE 802.11.

The IEEE 802.11 protocol may be IEEE 802.11ax/mc/ay. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include one or both of space-division multiple access (SDMA) or multiple-user multiple-input multiple-output (MU-MIMO).

The NAN devices 106 and NAN Ranging devices 104 may be wireless transmit and receive devices such as cellular telephone, smart telephone, handheld wireless device, wireless glasses, wireless watch, wireless personal device, tablet, or another device that may be transmitting and receiving using the IEEE 802.11 family protocols (as defined in IEEE 802.11mc), or a future IEEE 802.11 protocol (e.g., IEEE 802.11ax, IEEE 802.11ay, and IEEE 802.11az.) The NAN devices 106 and NAN Ranging devices 104 may operate in accordance with NAN operation defined in WFA NAN technical specification, or another wireless communication standard.

The NAN ranging devices 104 and/or NAN devices 106 may be configured to form a NAN cluster that are synchronized to a common clock. A timing synchronization function (TSF) may keep all the timers of the NAN ranging devices 104 and/or NAN devices 106 synchronized. The NAN ranging devices 104 and/or NAN devices 106 may be configured to transmit beacon frames for synchronizing timers. In some embodiments the NAN ranging devices 104 and/or NAN devices 106 may be configured to perform discovery of one another to form a NAN cluster.

In example embodiments, the NAN ranging devices 104 are configured to perform the methods and functions herein described in conjunction with FIGS. 1-4.

Figure 2:
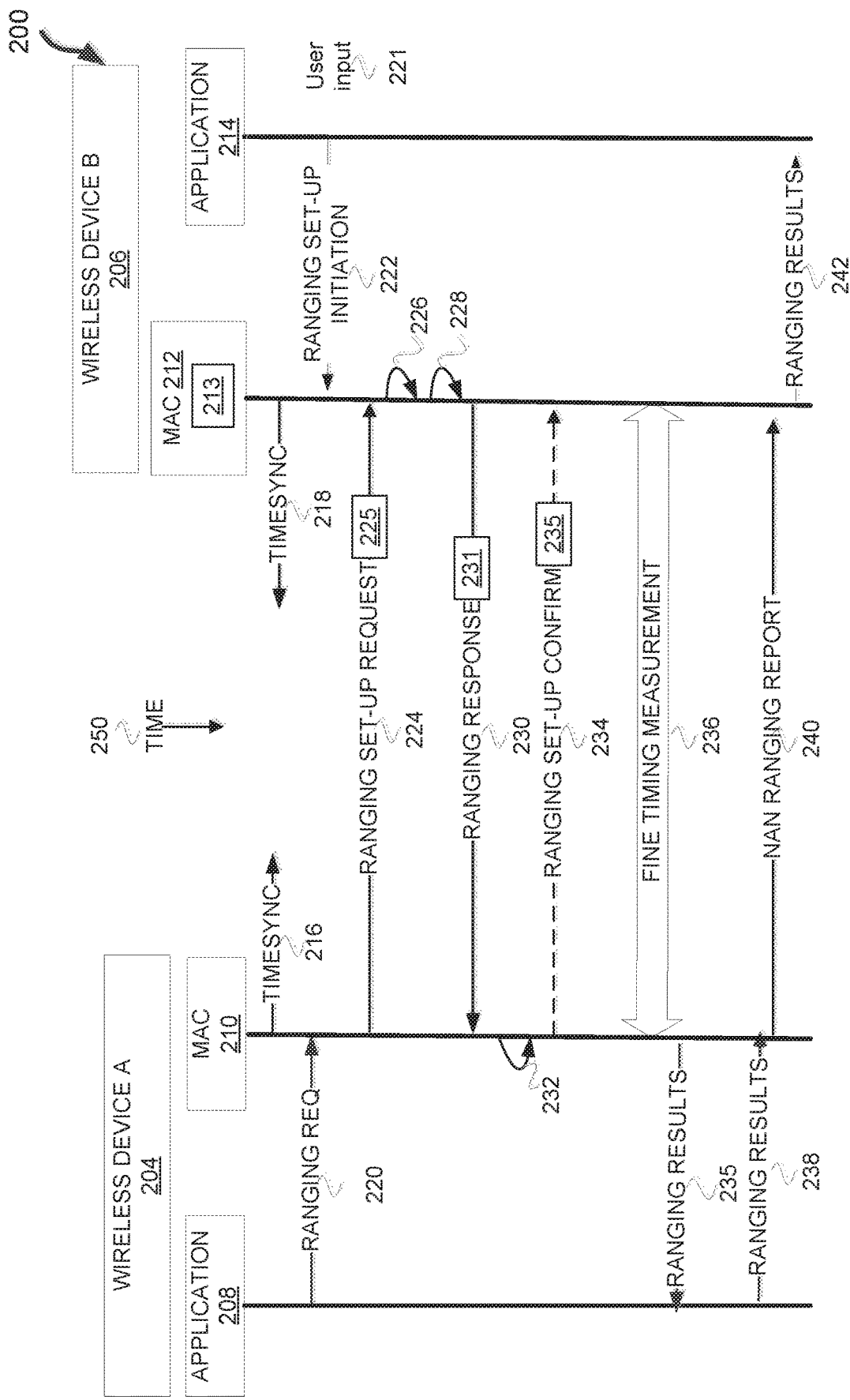
FIG. 2 illustrates a method of responding to a ranging request from a peer device in a P2P network in accordance with some embodiments.

FIG. 2 illustrates a method 200 of responding to a ranging request from a peer device in a P2P network in accordance with some embodiments. Illustrated in FIG. 2 is a timing diagram with time 250 along a vertical axis, wireless device A 204, and wireless device B 206. Wireless device A 204 and wireless device B 206 may each be a master station 102 or HE station 104. Wireless device A 204 and wireless device B 206 may each be one or more of the following: a NAN (2) device, a NAN (2) ranging engine, and/or a NAN (2) MAC layer.

The wireless device A 204 may include an application 208 and MAC 210 layer. The wireless device B 206 may include an application 212 and MAC 214 layer. The applications 208, 214 may be applications such as social networking applications, a user application program such email, an Internet browser, a portion of an operating system, etc. The MAC 210 layer and MAC 214 layer may be circuitry, firmware, or instructions stored in memory, that may be IEEE 802.11ax/mc or NAN(2) compliant layers and may also be compliant with one or more legacy IEEE 802.11 standards and/or subsequent IEEE 802.11 standards. MAC 210 layer and MAC 214 layer may be arranged to configure packets such as a physical layer convergence procedure (PLCP) protocol data unit (PPDUs) and arranged to transmit and receive PPDUs, NAN2 frames, and the packet illustrated in FIG. 2-4. The MAC 210 layer and/or MAC 212 layer may include a state 213 that indicates whether the MAC 212 layer is in an auto-response state or not. The state 213 may be associated with another portion of the wireless device B 206.

The method 200 may begin at operations 216 and 218 with wireless device A 204 and wireless device B 206 sending and receiving time synchronization (timesync) 216, 218. The timesynch 216, 218 may synchronize the timing (e.g., a timer) between wireless device A 204 and wireless device B 206. Wireless device A 204 and wireless device B 206 may synchronize time in accordance with one or more wireless communication standards such as IEEE 802.11. The timesync 216, 218 may have been in response to wireless device A 204 and/or wireless device B 206 detecting signals from the other wireless device.

The method 200 may continue at operation 220 with application 208 sending a ranging request to MAC 210 layer. For example, there may be an interface defined between the MAC 210 layer and the application 208 for requesting ranging. The ranging request 220 may include one or more ranging parameters (e.g., an accuracy required for the ranging and/or a maximal interval between ranging measurements.)

The method 200 may continue at operation 222 with an application 214 sending ranging set-up initiation 222 to the MAC 212 layer. The ranging set-up initiation 222 may include auto-response equal to true, which may indicate that the MAC 212 layer should respond to ranging set-up requests 220 automatically. In some embodiments, operation 222 may have been in response to user input 221 changing or initiating ranging set-up parameters. The MAC 212 layer may set state 213 to auto-response equal to true.

The ranging set-up initiation 222 may include a matching filter for response. The matching filter for response may include one or more ordered sequences, e.g. ordered sequence of <length, value> pairs which specify further response conditions beyond the service name used to filter ranging request messages to respond.

For example, one or more MAC addresses can be set as a matching filter. For example, if matching filter is set to true, and MAC addresses are used for filtering, then the MAC address of MAC 210 layer would have to be one of the MAC addresses set in the matching filter or ranging set-up request 224 would not be responded to. If the MAC address is matched, NAN(2) engine can automatically accept ranging request and provide the requested time slot by setting the status in the ranging setup attribute to "Requested". If matching filter doesn't match, the NAN engine can reject it by setting a status in the ranging setup attribute to "Reject/Fail". In some embodiments, all the actions described in this example do not require sending event "ranging request indication" to the NAN service. This is an optional field. It is present if auto-response flag is set to true. One or more of the operations 216, 218, 220, and 222 may be in a different order.

The method 200 may continue at operation 224 with the wireless device A 204 transmitting a ranging set-up request 224 to the wireless device B 206. The ranging set-up request 224 may include ranging set-up information, and time slots 225, which may include available time slots, and/or requested timeslots. For example, time slots 225 may include (slot1, slot2) as available timeslots with a requested timeslot of (slot2). The ranging set-up request 224 may include a service identification (ID) of the ranging service of the MAC 212, a MAC address of the MAC 212, a maximum interval between two ranging measurements, and an accuracy required for the ranging.

The method 200 continues at operation 226 with the MAC 212 determining whether to automatically respond to the ranging set-up request 224 or whether to pass the ranging set-up request 224 up a level, e.g. to the application 214. The MAC 213 layer may determine that the state 213 indicates that auto-respond is true based on state 213 being set to auto-respond equal to true at operation 222.

The method 200 continues at operation 228 with wireless device B 206 determining whether time slots 225 indicates time slots that are available for wireless device B 206. For example, time slots 225 include (slot1, slot2) as available timeslots with a requested timeslot of (slot2). Wireless device B 206 may have two cases. In case 1, wireless device B 206 can accommodate wireless device A 204 one of the time slots 225 that is the requested time slot, i.e. (slot2). In case 2, wireless device B 206 accommodates wireless device A 204 with (slot1), one of the time slots 225 indicated as available but not the requested time slot.

The method 200 continues at operation 230 with the wireless device B 206 transmitting ranging response 230. Ranging response 230 may include an available timeslot 231 of time slots 225 or a requested time slot of time slots 225. In some embodiments, wireless device B 206 may indicate that none of the time slots 225 are available and available timeslots 231 may include new time slots not in time slots 225 or a request for additional available time slots 225 from wireless device A 204.

The method 200 may continue at operation 232 with wireless device A 204 determining whether the available timeslot 231 is the requested time of the time slots 225 or an available timeslot of the time slots 225. In some embodiments, if available timeslots 231 (e.g., slot3) is not contained in time slots 225 (e.g., slot1, slot2), then wireless device A 204 may return to operation 224 with new time slots 225, or if available timeslot 231 includes new time slots, then wireless device A 204 may confirm the available timeslot 231 or return to operation 224.

If the available timeslot 231 is not the requested time slot (e.g., slot2), but an available timeslot (e.g., slot1) of time slots 225, then the method 200 continues at operation 234 with wireless device A 204 transmitting ranging set-up confirmation 234 to wireless device B 206. For example, ranging set-up confirm 234 may include a confirmation time slot 235 (e.g., slot 1, if available timeslot 213 is slot 1).

The method 200 continues to wireless device A 204 and wireless device B 206 performing a fine timing measurement 236 after operation 234 and if at operation 230 the available timeslot 231 is the requested time slot (e.g., slot2 in both cases.) The fine timing measurement 236 may be in accordance with one or more communication standards (IEEE 802.11). The fine timing measurement 236 may be in accordance with ranging set-up information. The fine timing measurement 236 may be a single burst in some embodiments. The MAC 210 may send the ranging results 235 to the application 208.

Optionally, in some embodiments, the method 200 continues at operation 238 with the application 208 sending the ranging results 238 to the MAC 210 layer. The method 200 may continue with wireless device A 204 transmitting the NAN ranging report 240 to wireless device B 206. The method 200 may continue at operation 242 with the MAC 212 layer sending the ranging results 242 to the application 214. The method 200 may end or may repeat the method 200 or a portion of the method 200.

Figure 3:
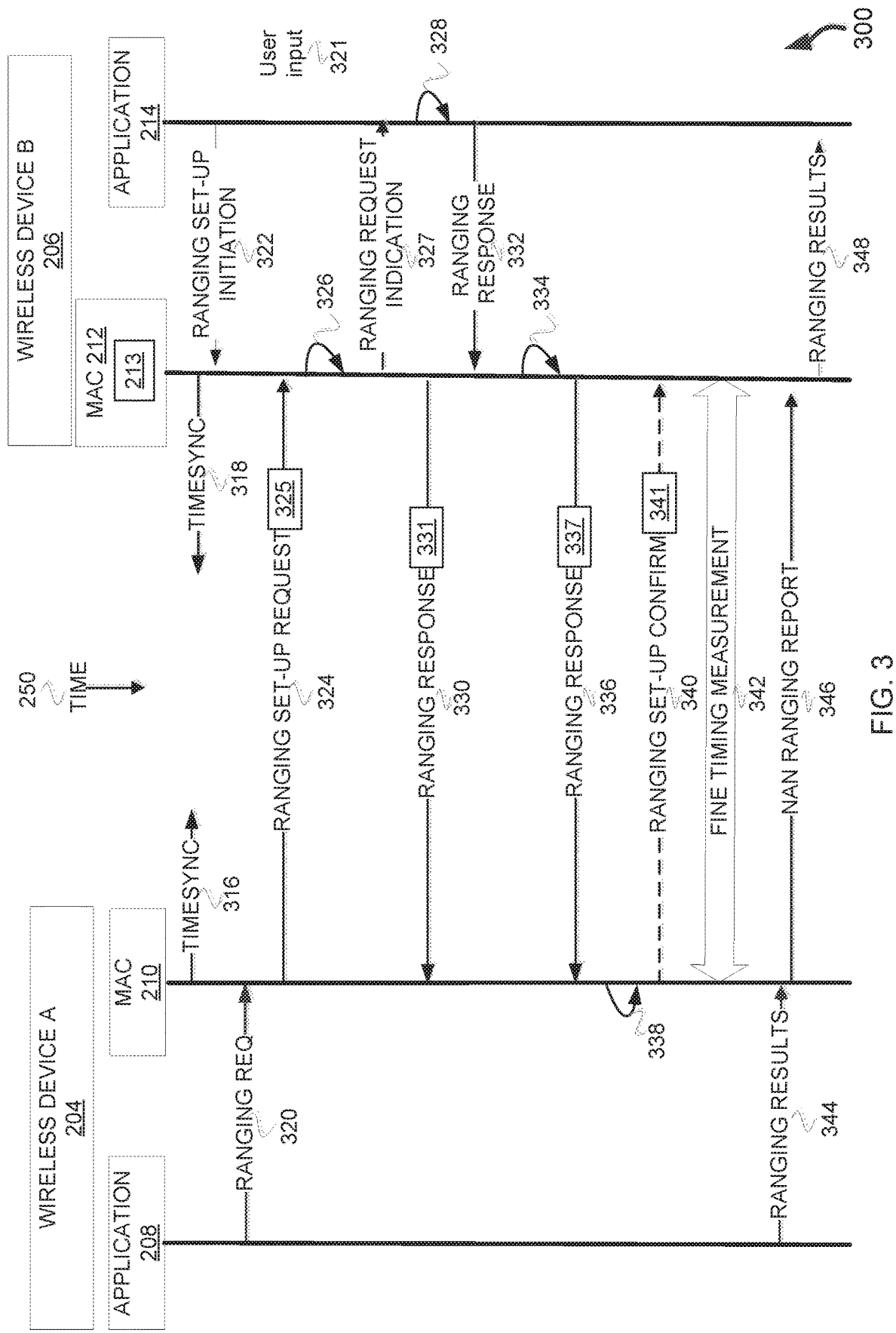
FIG. 3 illustrates a method of responding to a ranging request from a peer device in a P2P network in accordance with some embodiments.

FIG. 3 illustrates a method 300 of responding to a ranging request from a peer device in a P2P network in accordance with some embodiments. Illustrated in FIG. 3 is a timing diagram with time 250 along a vertical axis, wireless device A 204, and wireless device B 206. The MAC 210 layer and/or MAC 212 layer may include a state 213 that indicates whether the MAC 212 layer is in an auto-response state or not and may indicate. The state 213 may be associated with another portion of the wireless device B 206. The state 213 may include a matching filter that evaluates the ranging set-up request 324 and determines whether to respond to the ranging set-up request 324 based on the filter.

The method 300 may begin at operations 316 and 318 with wireless device A 204 and wireless device B 206 sending and receiving time synchronization (timesync) 316, 318. The timesynch 316, 318 may synchronize the timing (e.g., a timer) between wireless device A 204 and wireless device B 206. Wireless device A 204 and wireless device B 206 may synchronize time in accordance with one or more wireless communication standards such as IEEE 802.11. The timesync 316, 318 may have been in response to wireless device A 204 and/or wireless device B 206 detecting signals from the other wireless device.

The method 300 may continue at operation 320 with application 208 sending a ranging request to MAC 210 layer. For example, there may be an interface defined between the MAC 210 layer and the application 208 for requesting ranging. The ranging request 320 may include one or more ranging parameters (e.g., an accuracy required for the ranging and/or a maximal interval between ranging measurements.)

The method 300 may continue at operation 322 with an application 214 sending ranging set-up initiation 322 to the MAC 212 layer. The ranging set-up initiation 222 may include auto-response equal to false, which may indicate that the MAC 212 layer should respond to ranging set-up requests 220 automatically. In some embodiments, operation 322 may have been in response to user input 321 changing or initiating ranging set-up parameters. The MAC 212 and/or application 214 layer may set state 313 to auto-response equal to false.

The ranging set-up initiation 322 may include a matching filter for response. The matching filter for response may include one or more ordered sequences, e.g. ordered sequence of <length, value> pairs which specify further response conditions beyond the service name used to filter ranging request messages to respond.

For example, one or more MAC addresses can be set as a matching filter. For example, if matching filter is set to true, and MAC addresses are used for filtering, then the MAC address of MAC 210 layer would have to be one of the MAC addresses set in the matching filter or ranging set-up request 324 would not be responded to. If the MAC address is matched, NAN(2) engine can automatically accept ranging request and provide the requested time slot by setting the status in the ranging setup attribute to "Requested". If matching filter doesn't match, the NAN engine can reject it by setting a status in the ranging setup attribute to "Reject/Fail". In some embodiments, all the actions described in this example do not require sending event "ranging request indication" to the NAN service. This is an optional field. It is present if auto-response flag is set to true. One or more of the operations 316, 318, 320, and 322 may be in a different order.

The method 300 may continue at operation 324 with the wireless device A 204 transmitting a ranging set-up request 324 to the wireless device B 206. The ranging set-up request 324 may include ranging set-up information, and time slots 325, which may include available time slots, and/or requested timeslots. For example, time slots 325 may include (slot1, slot2) as available timeslots with a requested timeslot of (slot2). The ranging set-up request 324 may include a service identification (ID) of the ranging service of the MAC 212, a MAC address of the MAC 212, a maximum interval between two ranging measurements, and/or an accuracy required for the ranging.

The method 300 continues at operation 326 with the MAC 212 determining whether to automatically respond to the ranging set-up request 324 or whether to pass the ranging set-up request 324 up a level, e.g. to the application 214. The MAC 213 layer may determine that the state 213 indicates that auto-respond is false based on state 213 being set to auto-respond equal to false at operation 322.

The method 300 continues at operation 327 with the MAC 212 sending the ranging set-up request 324 to the application 214.

The method 300 continues at operation 328 with the application 214 requesting user input 321 from a user (not illustrated) regarding whether to respond to the ranging request indication 327. In some embodiments, the application 214 may have automatic mechanisms in place to respond to the ranging request indication 327. For example, the application 214 may be a social media application with an automatic setting to respond to any ranging request indication 327 that was generated by the same social media application on the requesting wireless device. The application 214 may additionally store user preferences that may be used for an automatic response (e.g., always say yes, say yes if the wireless device B 206 is not busy, say yes to any wireless device that is a friend of the wireless device B 206, etc.) Operation 330 may begin before operation 328 in some embodiments.

The method 300 may continue at operation 330 with the MAC 212 transmitting ranging response 330. The ranging response 330 may include ranging setup information 331. The ranging response 330 may indicate that the ranging response 330 is deferred. For example, the ranging response 330 may be deferred waiting for the application 214 to respond to the ranging request indication 327. In some embodiments, ranging response 330 with setup information 331 that indicates the ranging set-up request 225 is deferred if the automatic response is false.

The method 300 may continue at operation 332 with the application 214 sending a ranging response 332 to the MAC 212 layer. The ranging response 332 may indicate not to respond or to respond that the wireless device B 206 will not participate in the ranging. In some embodiments, a user may have indicated to respond to the ranging set-up request 325 and the application 214 sends a message to the MAC 212 layer indicating to respond to the ranging set-up request 325.

The method 300 continues at operation 334 with wireless device B 206 determining whether time slots 325 indicates time slots that are available for wireless device B 206. For example, time slots 325 include (slot1, slot2) as available timeslots with a requested timeslot of (slot2). Wireless device B 206 may have two cases. In case 1, wireless device B 206 can accommodate wireless device A 204 one of the time slots 325 that is the requested time slot, i.e. (slot2). In case 2, wireless device B 206 accommodates wireless device A 204 with (slot1), one of the time slots 325 indicated as available but not the requested time slot.

The method 300 continues at operation 336 with the wireless device B 206 transmitting ranging response 336. Ranging response 336 may include an available timeslot 337 of time slots 325 or a requested time slot of time slots 325. In some embodiments, wireless device B 206 may indicate that none of the time slots 325 are available and available timeslots 337 may include new time slots not in time slots 325 or a request for additional available time slots 325 from wireless device A 204.

The method 300 may continue at operation 338 with wireless device A 204 determining whether the available timeslot 337 is the requested time of the time slots 325 or an available timeslot of the time slots 325. In some embodiments, if available timeslots 337 (e.g., slot3) is not contained in time slots 325 (e.g., slot1, slot2), then wireless device A 204 may return to operation 324 with new time slots 325, or if available timeslot 337 includes new time slots, then wireless device A 204 may confirm the available timeslot 337 or return to operation 324.

If the available timeslot 337 is not the requested time slot (e.g., slot2), but an available timeslot (e.g., slot1) of time slots 325, then the method 300 continues at operation 340 with wireless device A 204 transmitting ranging set-up confirmation 340 to wireless device B 206. For example, ranging set-up confirm 340 may include a confirmation time slot 341 (e.g., slot1, if available timeslot 337 is slot 1).

The method 300 continues to wireless device A 204 and wireless device B 206 performing a fine timing measurement 342 after operation 340 and if at operation 336 the available timeslot 337 is the requested time slot (e.g., slot2 in both cases.) The fine timing measurement 342 may be in accordance with one or more communication standards (IEEE 802.11). The fine timing measurement 342 may be in accordance with ranging set-up information. The fine timing measurement 342 may be a single burst in some embodiments. The MAC 210 may send the ranging results (not illustrated) to the application 208.

Optionally, in some embodiments, the method 300 continues at operation 344 with the application 208 sending the ranging results 344 to the MAC 210 layer. The method 300 may continue with wireless device A 204 transmitting the NAN ranging report 346 to wireless device B 206. The method 300 may continue at operation 348 with the MAC 212 layer sending the ranging results 348 to the application 214. The method 300 may end or may repeat the method 300 or a portion of the method 300.

Figure 4:
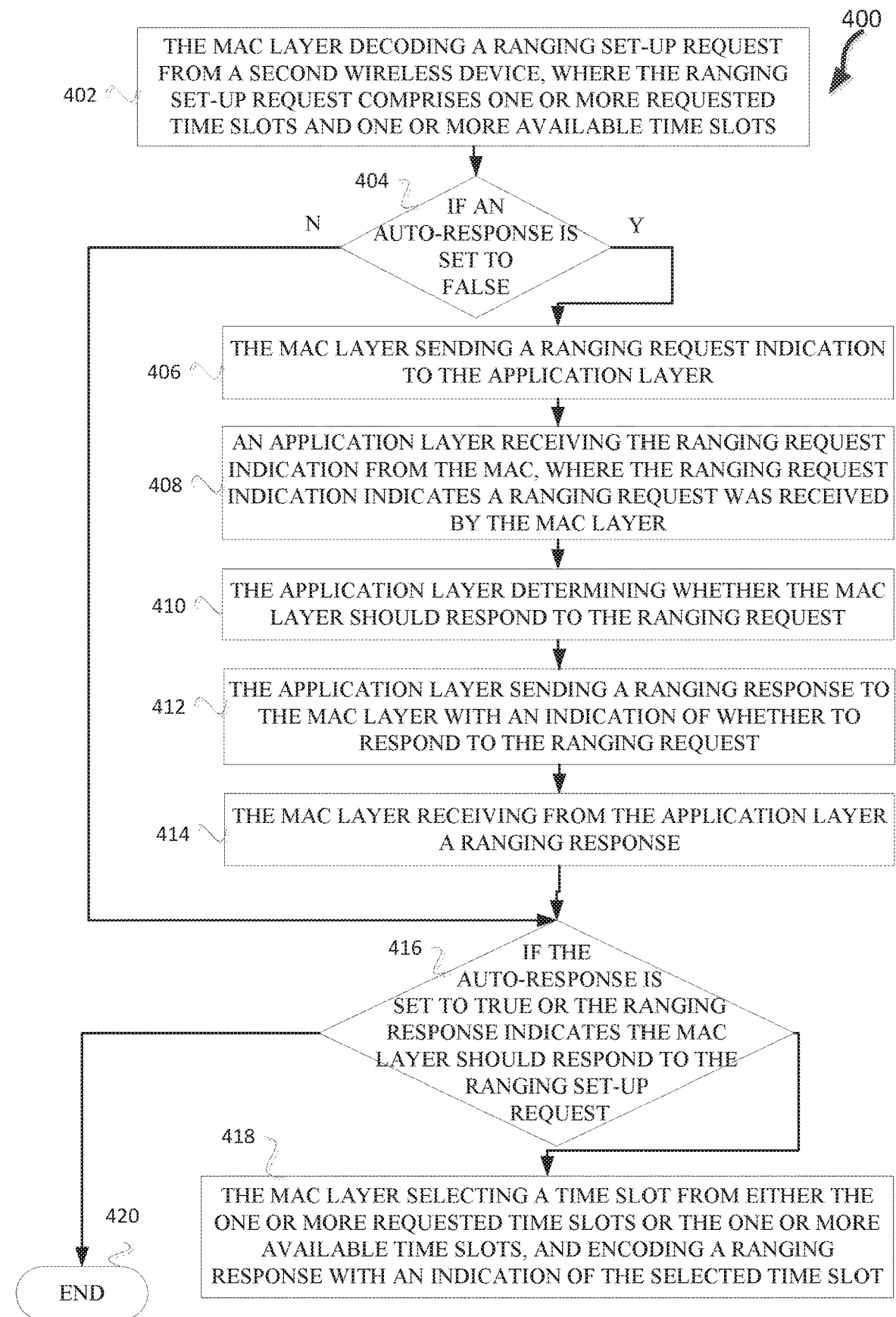
FIG. 4 illustrates a method of responding to a ranging request from a peer device in a P2P network in accordance with some embodiments.

FIG. 4 illustrates a method 400 of responding to a ranging request from a peer device in a P2P network in accordance with some embodiments. The method 400 may begin at operation 402 with the MAC layer decoding a ranging set-up request from a second wireless device, where the ranging set-up request comprises one or more requested time slots and one or more available time slots. For example, MAC 212 may receive ranging set-up request 324.

The method 400 may continue at operation 404 with a MAC layer determining if an auto-response is set to false. For example, the MAC 212 may determine if an auto-response is set to false or not.

If the auto-response is set to false, then the method 400 continues at operation 406 with the MAC layer sending a ranging request indication to the application layer. For example, MAC 212 may send ranging request indication 327 to the application 214.

The method 400 may continue at operation 408 with an application layer receiving the ranging request indication from the MAC, wherein the ranging request indication indicates a ranging request was received by the MAC layer. For example, the application 214 may receive the ranging request indication 327.

The method 400 may continue at operation 410 with the application layer determining whether the MAC layer should respond to the ranging request. For example, application 214 may determine at operation 328 whether the MAC layer should respond to the ranging request.

The method 400 may continue at operation 412 with the application layer sending a ranging response to the MAC layer with an indication of whether to respond to the ranging request. For example, application 214 may send the ranging response 332 to the MAC 212.

The method 400 may continue at operation 414 with the MAC layer receiving from the application layer the ranging response. For example, MAC 212 may receive the ranging response 332.

The method 400 continues with if the auto-response is set to true or the ranging response indicates the MAC layer should respond to the ranging set-up request, then continuing to operation 418 and otherwise the method 400 not sending a ranging response and continuing to operation 420. For example, the MAC 212 may send the ranging response 330 if the auto-response is set to true or the ranging response 332 indicates the MAC layer should respond to the ranging set-up request.

The method 400 continues at operation 418 with the MAC layer selecting a time slot from either the one or more requested time slots or the one or more available time slots, and encoding a ranging response with an indication of the selected time slot. For example, the MAC 212 may select a time slot at 334 and encode the ranging response 336. The method 400 may continue with additional operations to complete the ranging. At operation 404 if the auto-response is set to true then the method 400 continues at operation 416.

Figure 5:
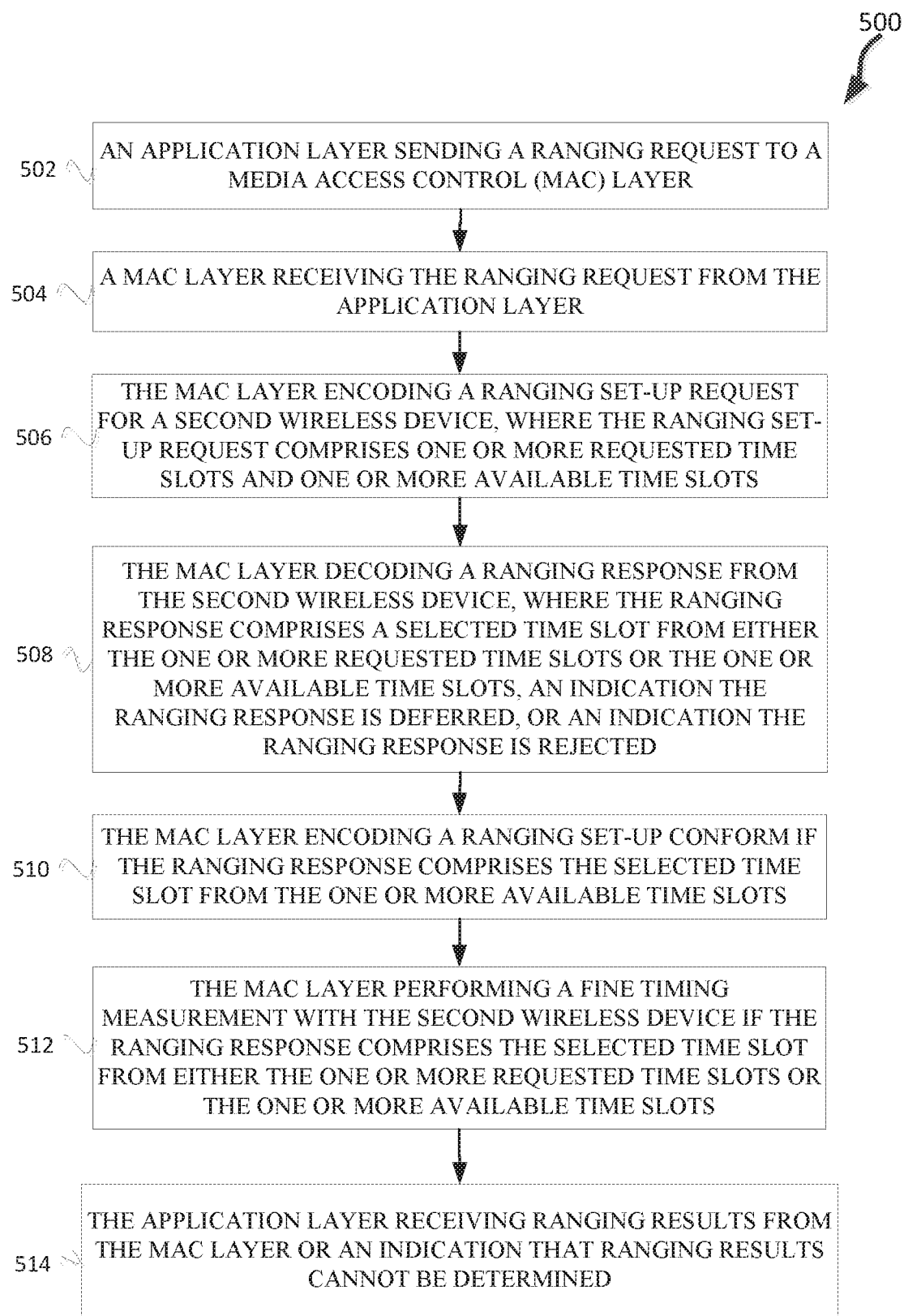
FIG. 5 illustrates a method of requesting a ranging from a peer device in a P2P network in accordance with some embodiments.

FIG. 5 illustrates a method 500 of requesting a ranging from a peer device in a P2P network in accordance with some embodiments. The method 500 may begin at operation 502 with an application layer sending a ranging request to a media access control (MAC) layer. For example, application 208 may send ranging request 220 to MAC 210.

The method 500 may continue at operation 504 with the MAC layer receiving the ranging request from the application layer. For example, the MAC 210 may receive ranging request 220.

The method 500 may continue at operation 506 with the MAC layer encoding a ranging set-up request for a second wireless device, where the ranging set-up request comprises one or more requested time slots and one or more available time slots. For example, the MAC 210 may encode ranging set-up request 224 as described in conjunction with FIG. 2.

The method 500 may continue at operation 508 with the MAC layer decoding a ranging response from the second wireless device, where the ranging response comprises a selected time slot from either the one or more requested time slots or the one or more available time slots, an indication the ranging response is deferred, or an indication the ranging response is rejected. For example, the MAC 210 may receive ranging response 230 or ranging response 330 as described in conjunction with FIGS. 2 and 3.

The method 500 may continue at operation 510 with the MAC layer encoding a ranging set-up conform if the ranging response comprises the selected time slot from the one or more available time slots. For example, the MAC 210 may encode the ranging set-up confirm 234 if the ranging response 230 comprises the selected time slot form the one or more available time slots.

The method 500 may continue at operation 512 with the MAC layer performing a fine timing measurement with the second wireless device if the ranging response comprises the selected time slot from either the one or more requested time slots or the one or more available time slots. For example, MAC 210 may perform a fine timing measurement 236 with wireless device B 206 if the ranging response 231 comprises the selected time slot from either the one or more requested time slots or the one or more available time slots.

The method 500 may continue at operation 514 with an application layer receiving ranging results from the MAC layer or an indication that ranging results cannot be determined. For example, MAC 210 may send ranging results 235 to application 208. The method 500 may continue with additional steps associated with ranging.

Figure 6:
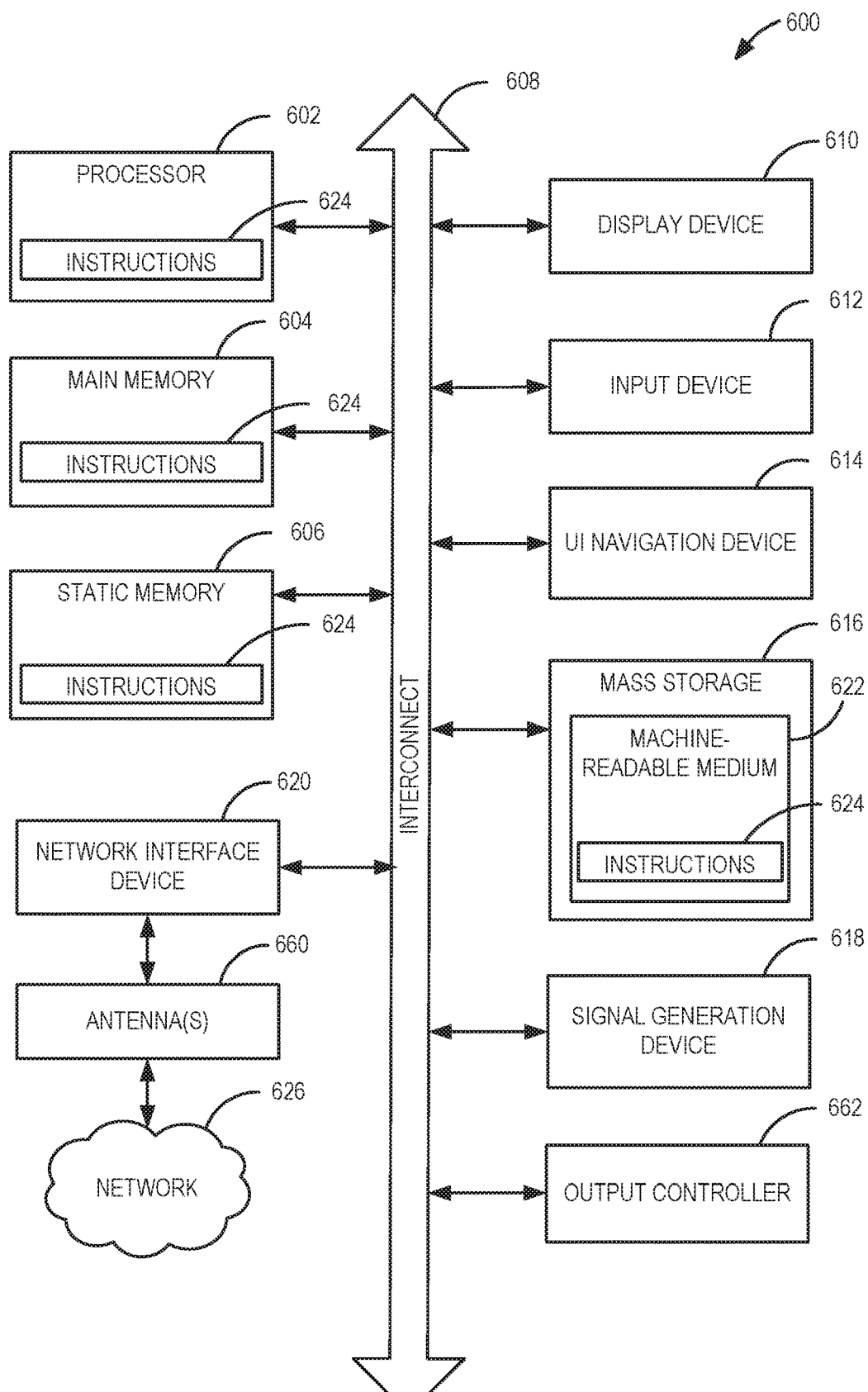
FIG. 6 illustrates a wireless station in accordance with some embodiments.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a NAN ranging device 104, a NAN device 106, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

The following examples pertain to further embodiments. Specifics in the examples may be used in one or more embodiments.

Example 1 is an apparatus of a first wireless device including memory, an application layer coupled to the memory, wherein the application layer is configured to: receive a ranging request indication from a media access control (MAC) layer, wherein the ranging request indication indicates a ranging request was received by the MAC layer, determine whether the MAC layer should respond to the ranging request, and send a ranging response to the MAC layer with an indication of whether to respond to the ranging request, and the MAC layer coupled to the memory and the application layer, the MAC layer comprising processing circuitry configured to: decode a ranging set-up request from a second wireless device, wherein the ranging set-up request comprises one or more requested time slots and one or more available time slots, if an auto-response is set to false, send the ranging request indication to the application layer and receive from the application layer a ranging response, and if the auto-response is set to true or the ranging response indicates the MAC layer should respond to the ranging set-up request, select a time slot from either the one or more requested time slots or the one or more available time slots, and encode a ranging response with an indication of the selected time slot.

In Example 2, the subject matter of Example 1 can optionally include where the processing circuitry is further configured to: if the time slot is selected from the one or more available time slots, wait to decode a ranging set-up confirmation from the second wireless device, wherein the ranging set-up confirmation confirms the time slot selected from the one or more available time slots, and perform a fine timing measurement with the second wireless device in accordance with the selected time slot from the one or more available time slots.

In Example 3, the subject matter of Examples 1 or 2 can optionally include where the processing circuitry is further configured to: select the time slot from the one or more requested time slots if the wireless device is free for one of the one or more requested time slots.

In Example 4, the subject matter of any of Examples 1-3 can optionally include where the processing circuitry is further configured to: receive a ranging set-up initiation from the application layer, set auto-response to false if ranging set-up initiation indicates to set auto-response to false, and set auto-response to true if ranging set-up initiation indicates to set auto-response to true.

In Example 5, the subject matter of Example 4 can optionally include where the ranging set-up initiation further comprises one or more response conditions to be used by the MAC layer to filter the ranging request.

In Example 6, the subject matter of Example 6 can optionally include where the processing circuitry is further configured to: reject the ranging request if the one or more response conditions are not met by the ranging request.

In Example 7, the subject matter of Example 6 can optionally include where the one or more response conditions comprises MAC addresses, and where the processing circuitry is further configured to: reject the ranging request if a MAC address of the ranging request is not included in the one or more response conditions as an acceptable MAC address.

In Example 8, the subject matter of any of Examples 1-7 can optionally include where the processing circuitry is further configured to: encode a second ranging response with an indication that the ranging response is deferred, if the auto-response is set to true.

In Example 9, the subject matter of any of Examples 1-8 can optionally include where the application layer is further configured to: prompt a user for whether to respond to the ranging request, receive input from the user, and determine whether the MAC layer should respond to the ranging request based on the input from the user.

In Example 10, the subject matter of any of Examples 1-9 can optionally include where the processing circuitry is part of a neighbor area network (NAN) engine.

In Example 11, the subject matter of Example 10 can optionally include where the ranging request further comprises a service identification (ID) that identifies a fine timing measurement service of the NAN engine.

In Example 12, the subject matter of any of Examples 1-11 can optionally include where the processing circuitry is further configured to: receive a ranging report frame from the second wireless device, the ranging report indicating a distance between the first wireless device and the second wireless device.

In Example 13, the subject matter of any of Examples 1-12 can optionally include where the second wireless device is a peer of the first wireless device.

In Example 14, the subject matter of any of Examples 1-13 can optionally include where the first wireless device and the second wireless device are each one from the following group: a neighbor awareness networking (NAN) device, a NAN 2 device, a NAN ranging device, a wireless device configured to operate in accordance with Institute of Electrical and Electronic Engineers (IEEE) 802.11, an IEEE 802.11 station, an IEEE 802.11 access point, a wireless device to operate in accordance with IEEE 802.11ax, and a wireless device to operate in accordance with IEEE 802.11ay.

In Example 15, the subject matter of any of Examples 1-15 can optionally include transceiver circuitry coupled to the memory.

In Example 16, the subject matter of any of Examples 1-16 can optionally include one or more antennas coupled to the transceiver circuitry.

Example 17 is a method performed by a first wireless device, the method including: the MAC layer decoding a ranging set-up request from a second wireless device, where the ranging set-up request comprises one or more requested time slots and one or more available time slots, if an auto-response is set to false, the MAC layer sending a ranging request indication to an application layer, an application layer receiving the ranging request indication from the MAC, where the ranging request indication indicates a ranging request was received by the MAC layer, the application layer determining whether the MAC layer should respond to the ranging request, the application layer sending a ranging response to the MAC layer with an indication of whether to respond to the ranging request, and the MAC layer receiving from the application layer the ranging response, and if the auto-response is set to true or the ranging response indicates the MAC layer should respond to the ranging set-up request, the MAC layer selecting a time slot from either the one or more requested time slots or the one or more available time slots, and encoding a ranging response with an indication of the selected time slot.

In Example 18, the subject matter of Example 17 can optionally include if the time slot is selected from the one or more available time slots, the MAC layer waiting to decode a ranging set-up confirmation from the second wireless device, where the ranging set-up confirmation confirms the time slot selected from the one or more available time slots, and the MAC layer performing a fine timing measurement with the second wireless device in accordance with the selected time slot from the one or more available time slots.

Example 19 is a non-transitory computer-readable storage medium that stores instructions for execution by one or more processors. The instructions to configure the one or more processors to cause: an application layer of a first wireless device to receive a ranging request indication from a media access control (MAC) layer of the first wireless device, where the ranging request indication indicates a ranging request was received by the MAC layer, the application layer to determine whether the MAC layer should respond to the ranging request, the application layer to send a ranging response to the MAC layer with an indication of whether to respond to the ranging request, the MAC layer to decode a ranging set-up request from a second wireless device, where the ranging set-up request comprises one or more requested time slots and one or more available time slots, the MAC layer to send a ranging request indication to the application layer, the MAC layer to receive from the application layer a ranging response, if an auto-response is set to false, and if the auto-response is set to true or the ranging response indicates the MAC layer should respond to the ranging set-up request, the MAC layer to select a time slot from either the one or more requested time slots or the one or more available time slots, and to encode a ranging response with an indication of the selected time slot.

In Example 20, the subject matter of Example 19 can optionally include where the instructions configure the one or more processors to cause: if the time slot is selected from the one or more available time slots, the MAC layer to wait to decode a ranging set-up confirmation from the second wireless device, where the ranging set-up confirmation confirms the time slot selected from the one or more available time slots, and the MAC layer to perform a fine timing measurement with the second wireless device in accordance with the selected time slot from the one or more available time slots.

In Example 21, the subject matter of Examples 19 or 20 can optionally include where the instructions configure the one or more processors to cause: the MAC layer to receive a ranging set-up initiation from the application layer, the MAC layer to set auto-response to false if ranging set-up initiation indicates to set auto-response to false, and the MAC layer to set auto-response to true if ranging set-up initiation indicates to set auto-response to true.

In Example 22, the subject matter of any of Examples 19-21 can optionally include where the first wireless device and the second wireless device are each one from the following group: a neighbor awareness networking (NAN) device, a NAN 2 device, a NAN ranging device, a wireless device configured to operate in accordance with Institute of Electrical and Electronic Engineers (IEEE) 802.11, an IEEE 802.11 station, an IEEE 802.11 access point, a wireless device to operate in accordance with IEEE 802.11ax, and a wireless device to operate in accordance with IEEE 802.11ay.

Example 23 is an apparatus of a first wireless device including memory, an application layer coupled to the memory, where the application layer is configured to: send a ranging request to a media access control (MAC) layer, receive ranging results from the MAC layer or an indication that ranging results cannot be determined, the MAC layer coupled to the memory and the application layer, the MAC layer including processing circuitry configured to: receive the ranging request from the application layer, encode a ranging set-up request for a second wireless device, where the ranging set-up request comprises one or more requested time slots and one or more available time slots, decode a ranging response from the second wireless device, where the ranging response comprises a selected time slot from either the one or more requested time slots or the one or more available time slots, an indication the ranging response is deferred, or an indication the ranging response is rejected, encode a ranging set-up conform if the ranging response comprises the selected time slot from the one or more available time slots, and perform a fine timing measurement with the second wireless device if the ranging response comprises the selected time slot from either the one or more requested time slots or the one or more available time slots.

In Example 24, the subject matter of Example 23 can optionally include where the apparatus further comprises transceiver circuitry coupled to the memory.

In Example 25, the subject matter of Example 24 can optionally include where the apparatus further comprises one or more antennas coupled to the transceiver circuitry.

Example 26 is an apparatus of a first wireless device, the apparatus including: means for receiving a ranging request indication from a media access control (MAC) layer, where the ranging request indication indicates a ranging request was received by a MAC layer, means for determining whether the MAC layer should respond to the ranging request, and means for sending a ranging response to the MAC layer with an indication of whether to respond to the ranging request, means for decoding a ranging set-up request from a second wireless device, where the ranging set-up request comprises one or more requested time slots and one or more available time slots, if an auto-response is set to false, means for sending the ranging request indication to the application layer and receive from the application layer a ranging response, and if the auto-response is set to true or the ranging response indicates the MAC layer should respond to the ranging set-up request, means for selecting a time slot from either the one or more requested time slots or the one or more available time slots, and encode a ranging response with an indication of the selected time slot.

In Example 27, the subject matter of Example 26 can optionally include if the time slot is selected from the one or more available time slots, means for waiting to decode a ranging set-up confirmation from the second wireless device, where the ranging set-up confirmation confirms the time slot selected from the one or more available time slots, and means for performing a fine timing measurement with the second wireless device in accordance with the selected time slot from the one or more available time slots.

In Example 28, the subject matter of Examples 26 or 27 can optionally include means for selecting the time slot from the one or more requested time slots if the wireless device is free for one of the one or more requested time slots.

In Example 29, the subject matter of any of Examples 26-28 can optionally include means for receiving a ranging set-up initiation from the application layer, means for setting auto-response to false if ranging set-up initiation indicates to set auto-response to false, and means for setting auto-response to true if ranging set-up initiation indicates to set auto-response to true.

In Example 30, the subject matter of Example 29 can optionally include where the ranging set-up initiation further comprises one or more response conditions to be used by the MAC layer to filter the ranging request.

In Example 31, the subject matter of Example 30 can optionally include means for rejecting the ranging request if the one or more response conditions are not met by the ranging request.

In Example 32, the subject matter of Example 31 can optionally include where the one or more response conditions comprises MAC addresses, and further including: means for rejecting the ranging request if a MAC address of the ranging request is not included in the one or more response conditions as an acceptable MAC address.

In Example 33, the subject matter of any of Examples 26-32 can optionally include means for encoding a second ranging response with an indication that the ranging response is deferred, if the auto-response is set to true.

In Example 34, the subject matter of any of Examples 26-33 can optionally include means for prompting a user for whether to respond to the ranging request, means for receiving input from the user, and means for determining whether the MAC layer should respond to the ranging request based on the input from the user.

In Example 35, the subject matter of any of Examples 26-34 can optionally include means for a neighbor area network (NAN) engine.

In Example 36, the subject matter of Example 35 can optionally include where the ranging request further comprises a service identification (ID) that identifies a fine timing measurement service of the NAN engine.

In Example 37, the subject matter of any of Examples 26-36 can optionally include means for receiving a ranging report frame from the second wireless device, the ranging report indicating a distance between the first wireless device and the second wireless device.

In Example 38, the subject matter of any of Examples 26-37 can optionally include where the second wireless device is a peer of the first wireless device.

In Example 39, the subject matter of any of Examples 26-38 can optionally include where the first wireless device and the second wireless device are each one from the following group: a neighbor awareness networking (NAN) device, a NAN 2 device, a NAN ranging device, a wireless device configured to operate in accordance with Institute of Electrical and Electronic Engineers (IEEE) 802.11, an IEEE 802.11 station, an IEEE 802.11 access point, a wireless device to operate in accordance with IEEE 802.11ax, and a wireless device to operate in accordance with IF EE 802.11ay.

In Example 40, the subject matter of any of Examples 26-39 can optionally include means for processing received radio signals and means for processing radio signals to be transmitted.

In Example 41, the subject matter of any of Examples 26-40 can optionally include means for transmitting and receiving radio signals.

Example 42 is a non-transitory computer-readable storage medium that stores instructions for execution by one or more processors. The instructions to configure the one or more processors to cause a first wireless device to: send a ranging request to a media access control (MAC) layer, receive ranging results from the MAC layer or an indication that ranging results cannot be determined, receive the ranging request from an application layer, encode a ranging set-up request for a second wireless device, where the ranging set-up request comprises one or more requested time slots and one or more available time slots, decode a ranging response from the second wireless device, where the ranging response comprises a selected time slot from either the one or more requested time slots or the one or more available time slots, an indication the ranging response is deferred, or an indication the ranging response is rejected, encode a ranging set-up conform if the ranging response comprises the selected time slot from the one or more available time slots, and perform a fine timing measurement with the second wireless device if the ranging response comprises the selected time slot from either the one or more requested time slots or the one or more available time slots.

In Example 43, the subject matter of Examples 42 can optionally include where the instructions configure the one or more processors to cause the first wireless device to: if the time slot is selected from the one or more available time slots, wait to decode a ranging set-up confirmation from the second wireless device, where the ranging set-up confirmation confirms the time slot selected from the one or more available time slots, and perform a fine timing measurement with the second wireless device in accordance with the selected time slot from the one or more available time slots.

Example 44 is a method performed by a first wireless device, the method including: sending a ranging request to a media access control (MAC) layer, receiving ranging results from the MAC layer or an indication that ranging results cannot be determined, receiving the ranging request from an application layer, encoding a ranging set-up request for a second wireless device, where the ranging set-up request comprises one or more requested time slots and one or more available time slots, decoding a ranging response from the second wireless device, where the ranging response comprises a selected time slot from either the one or more requested time slots or the one or more available time slots, an indication the ranging response is deferred, or an indication the ranging response is rejected, encoding a ranging set-up conform if the ranging response comprises the selected time slot from the one or more available time slots, and performing a fine timing measurement with the second wireless device if the ranging response comprises the selected time slot from either the one or more requested time slots or the one or more available time slots.

In Example 45, the subject matter of Example 44 can optionally include if the time slot is selected from the one or more available time slots, waiting to decode a ranging set-up confirmation from the second wireless device, where the ranging set-up confirmation confirms the time slot selected from the one or more available time slots, and performing a fine timing measurement with the second wireless device in accordance with the selected time slot from the one or more available time slots.

Example 46 is an apparatus of a first wireless device, the method including: means for sending a ranging request to a media access control (MAC) layer, means for receiving ranging results from the MAC layer or an indication that ranging results cannot be determined, means for receiving the ranging request from an application layer, means for encoding a ranging set-up request for a second wireless device, where the ranging set-up request comprises one or more requested time slots and one or more available time slots, means for decoding a ranging response from the second wireless device, where the ranging response comprises a selected time slot from either the one or more requested time slots or the one or more available time slots, an indication the ranging response is deferred, or an indication the ranging response is rejected, means for encoding a ranging set-up conform if the ranging response comprises the selected time slot from the one or more available time slots, and means for performing a fine timing measurement with the second wireless device if the ranging response comprises the selected time slot from either the one or more requested time slots or the one or more available time slots.

In Example 47 the subject matter of Example 46 can optionally include if the time slot is selected from the one or more available time slots, means for waiting to decode a ranging set-up confirmation from the second wireless device, where the ranging set-up confirmation confirms the time slot selected from the one or more available time slots, and means for performing a fine timing measurement with the second wireless device in accordance with the selected time slot from the one or more available time slots.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a Neighbor Awareness Network (NAN) device, the NAN device configured for NAN ranging operations, the apparatus comprising:
   Media Access Control (MAC) layer circuitry; and
   a physical (PHY) layer,
   wherein the MAC layer circuitry comprises a NAN engine configured to interface with an application layer of the NAN device,
   wherein the application layer of the NAN device is configured to operate a NAN service, and
   wherein as part of the NAN ranging operations, the NAN engine is configured to:
   set an auto-response if a range response received from the application layer includes an auto-response flag that is set to true;
   decode a ranging request frame received from a peer NAN device, the ranging request frame being a request to start a ranging session setup procedure;
   in response to receipt of the ranging request frame, determine if the auto-response is set;
   if the auto-response is set, encode a ranging response frame for transmission to the peer NAN device to accept the request;
   if the auto-response is not set:
   generate a range request indication for the application layer;
   receive, in response to the range request indication, a second range response from the application layer, the second range response indicating whether to accept the request; and
   encode a ranging response frame for transmission by the PHY layer to the peer NAN device to accept the request if the second range response indicates to accept the request,
   wherein the ranging response frame includes a ranging setup attribute and availability information, the ranging setup attribute and the availability information comprising parameters for the NAN ranging operations,
   if the request is accepted, perform the NAN ranging operations including a single burst fine-timing measurement (FTM) procedure with the peer NAN device to obtain a range to the peer NAN device, the NAN ranging operations performed based on information exchanged via the ranging response frame and the ranging request frame.

2. The apparatus of claim 1, wherein in further response to receipt of the ranging request frame, the NAN engine is further configured to:
   determine if a matching filter is present; and
   encode the ranging response frame for transmission to the peer NAN device to indicate acceptance of the request if the auto response is set and the matching filter is matched.

3. The apparatus of claim 2, wherein the auto-response is set to false if not set to true or if the range response from the application layer does not include an auto-response flag that is set to true.

4. The apparatus of claim 2, wherein the range request indication is invoked by the application layer of the NAN device operating the NAN service.

5. The apparatus of claim 2 wherein the NAN engine is further configured to perform a fine timing measurement with the peer NAN device during a time indicated by the availability information.

6. The apparatus of claim 5 wherein the ranging setup attribute comprises one or more response conditions to be used to filter the request, wherein the NAN engine is further configured to reject the request if the one or more response conditions are not met.

7. The apparatus of claim 2 wherein the apparatus further comprises memory configured to store the information exchanged via the ranging response and ranging request frames.

8. The apparatus of claim 1 wherein the PHY layer is an 802.11 PHY layer.

9. The apparatus of claim 8 wherein the PHY layer is configured to be coupled with one or more antennas.

10. A non-transitory computer-readable storage medium that stores instructions for execution by MAC layer circuitry of a Neighbor Awareness Network (NAN) device, to configure the device for NAN ranging operations, wherein the MAC layer circuitry comprises a NAN engine configured to interface with an application layer of the NAN device,
wherein the application layer of the NAN device is configured to operate a NAN service, and
wherein as part of the NAN ranging operations, the instructions configure the NAN engine to:
set an auto-response if a range response received from the application layer includes an auto-response flag that is set to true;
decode a ranging request frame received from a peer NAN device, the ranging request frame being a request to start a ranging session setup procedure;
in response to receipt of the ranging request frame, determine if the auto-response is set;
if the auto-response is set, encode a ranging response frame for transmission to the peer NAN device to accept the request;
if the auto-response is not set:
generate a range request indication for the application layer;
receive, in response to the range request indication, a second range response from the application layer, the second range response indicating whether to accept the request; and
encode a ranging response frame for transmission by the PHY layer to the peer NAN device to accept the request if the second range response indicates to accept the request,
wherein the ranging response frame includes a ranging setup attribute and availability information, the ranging setup attribute and the availability information comprising parameters for the NAN ranging operations,
if the request is accepted, perform the NAN ranging operations including a single burst fine-timing measurement (FTM) procedure with the peer NAN device to obtain a range to the peer NAN device, the NAN ranging operations performed based on information exchanged via the ranging response frame and the ranging request frame.

11. The computer-readable storage medium of claim 10, wherein in further response to receipt of the ranging request frame, the NAN engine is further configured to:
determine if a matching filter is present; and
encode the ranging response frame for transmission to the peer NAN device to indicate acceptance of the request if the auto response is set and the matching filter is matched.

12. The computer-readable storage medium of claim 11, wherein the auto-response is set to false if not set to true or if the range response from the application layer does not include an auto-response flag that is set to true.

13. The computer-readable storage medium of claim 11, wherein the range request indication is invoked by the application layer of the NAN device operating the NAN service.

14. The computer-readable storage medium of claim 11 wherein the NAN engine is further configured to perform a fine timing measurement with the peer NAN device during a time indicated by the availability information.

15. A method performed by MAC layer circuitry of a Neighbor Awareness Network (NAN) device, to configure the NAN device for NAN ranging operations, wherein the MAC layer circuitry comprises a NAN engine configured to interface with an application layer of the NAN device,
wherein the application layer of the NAN device is configured to operate a NAN service, and
wherein as part of the NAN ranging operations, the method comprises:
setting an auto-response if a range response received from the application layer includes an auto-response flag that is set to true;
decoding a ranging request frame received from a peer NAN device, the ranging request frame being a request to start a ranging session setup procedure;
in response to receipt of the ranging request frame, determining if the auto-response is set;
if the auto-response is set, encoding a ranging response frame for transmission to the peer NAN device to accept the request;
if the auto-response is not set:
generating a range request indication for the application layer;
receiving, in response to the range request indication, a second range response from the application layer, the second range response indicating whether to accept the request; and
encoding a ranging response frame for transmission by the PHY layer to the peer NAN device to accept the request if the second range response indicates to accept the request,
wherein the ranging response frame includes a ranging setup attribute and availability information, the ranging setup attribute and the availability information comprising parameters for the NAN ranging operations,
if the request is accepted, the method includes performing the NAN ranging operations including a single burst fine-timing measurement (FTM) procedure with the peer NAN device to obtain a range to the peer NAN device, the NAN ranging operations performed based on information exchanged via the ranging response frame and the ranging request frame.

16. The method of claim 15, wherein in further response to receipt of the ranging request frame, the method further comprises:
determining if a matching filter is present; and
encoding the ranging response frame for transmission to the peer NAN device to indicate acceptance of the request if the auto response is set and the matching filter is matched.

17. The method of claim 16 wherein the auto-response is set to false if not set to true or if the range response from the application layer does not include an auto-response flag that is set to true.

18. The method of claim 16, wherein the range request indication is invoked by the application layer of the NAN device operating the NAN service.

19. The method of claim 16, further comprising performing a fine timing measurement with the peer NAN device during a time indicated by the availability information.

* * * * *